No. 733,084. PATENTED JULY 7. 1903.
C. L. & R. A. SCHULTZ.
AUTOTRUCK.
APPLICATION FILED JULY 25, 1900.
NO MODEL. 9 SHEETS—SHEET 1.

Fig. 1

Witnesses:
G. S. Noble
M. Faulds

Inventors,
Charles L. Schultz
Robert A. Schultz
By H. C. Hunsberger Att'y.

No. 733,084. PATENTED JULY 7, 1903.
C. L. & R. A. SCHULTZ.
AUTOTRUCK.
APPLICATION FILED JULY 25, 1900.
NO MODEL. 9 SHEETS—SHEET 2.

Fig. 2.

Witnesses:
G. S. Noble
M. Faulds.

Inventors,
Charles L. Schultz
Robert A. Schultz
By H. C. Hunsberger Att'y

No. 733,084. PATENTED JULY 7, 1903.
C. L. & R. A. SCHULTZ.
AUTOTRUCK.
APPLICATION FILED JULY 25, 1900.
NO MODEL. 9 SHEETS—SHEET 3.

Witnesses:
G. S. Noble
M. Faulds

Inventors,
Charles L Schultz
Robert A Schultz
By H C Hunsberger Att'y

No. 733,084. PATENTED JULY 7, 1903.
C. L. & R. A. SCHULTZ.
AUTOTRUCK.
APPLICATION FILED JULY 25, 1900.
NO MODEL. 9 SHEETS—SHEET 6.

Witnesses:
G. S. Noble
M. Faulds.

Inventors,
Charles L. Schultz
Robert A. Schultz
By H. C. Hunsinger Att'y.

THE NORRIS PETERS CO., PHOTO-LITHO., WASHINGTON, D. C.

No. 733,084. PATENTED JULY 7, 1903.
C. L. & R. A. SCHULTZ.
AUTOTRUCK.
APPLICATION FILED JULY 25, 1900.
NO MODEL. 9 SHEETS—SHEET 8.

No. 733,084.

Patented July 7, 1903.

UNITED STATES PATENT OFFICE.

CHARLES L. SCHULTZ AND ROBERT A. SCHULTZ, OF CHICAGO, ILLINOIS.

AUTOTRUCK.

SPECIFICATION forming part of Letters Patent No. 733,084, dated July 7, 1903.

Application filed July 25, 1900. Serial No. 24,842. (No model.)

*To all whom it may concern:*

Be it known that we, CHARLES L. SCHULTZ and ROBERT A. SCHULTZ, citizens of the United States, residing at Chicago, county of Cook, and State of Illinois, have invented a new and useful Improvement in Autotrucks, of which the following is a specification.

This invention relates to that class of traction-vehicles in which a gasolene-engine or other motor having but one direction may be used and which is designed for road purposes to carry heavy burdens as a substitute for road-wagons drawn by animal power. In this device the motive power is arranged to be applied simultaneously to both the rear and front wheels by means of traction-shafts applied front and rear. Reverse mechanism is installed to move the truck rearward and a steering-gear to change the direction at will by the same motive power.

The invention is illustrated in the accompanying drawings, in which—

Similar numerals refer to similar parts throughout the several views.

Our improved autotruck comprises a four-wheel vehicle carrying a body 1, which is mounted on springs 2, erected on the two axles. The body 1 is intended to be constructed as broad and long as the same can conveniently be made, having regard to the length and width of the running-gear, by extending it over the wheels, securing for it the utmost carrying capacity. It will be noted that in the construction shown the driving mechanism, including the motor and connections, is located underneath the body in order to avoid trespassing upon the carrying-space.

The wheels 3 3 of the truck are constructed with a broad rim, securing a wide tread, a description of which will be given below. Attached rigidly to the hubs 4 on the inner side of the rear wheels are spur-gears 5, which engage with pinions 6 6 on the traction-shaft 7, laid in bearings parallel with the rear axle. The bearings for the traction-shaft 7 are provided in a frame 8, which is triangular in form, extending from the rear axle to the central point of the front axle. Hangers suspended from the body 1 provide bearings for the crank or driving shaft 10, which derives its motion from a gasolene or other motor having but one direction, to the piston of which it is connected in the usual manner. The main or driven shaft 11, also suspended from the body in suitable bearings, lies parallel with the crank-shaft and derives its motion from it, which will be more particularly referred to hereinafter. A flexible rotary shaft 12, shiftable at one end in its bearings and provided with pinions at each end, extends rearward from the main shaft 11 to the traction-shaft 7 and conveys motion from the main shaft to said traction-shaft. A second traction-shaft 13, provided with bearings underneath and parallel with the front axle 14, is also operatively connected with the main shaft 11 by a second rotary shaft 15, having pinions at each end.

On the main shaft 11 is a compensating gear 18, and on one side of this compensating gear on said shaft is a sleeve 16, carrying two facing bevel gear-wheels 17 and 17', and on the same shaft on the other side of the compensating gear 18 two similar facing bevels 19 and 19', rigid on the shaft.

Figure 1:
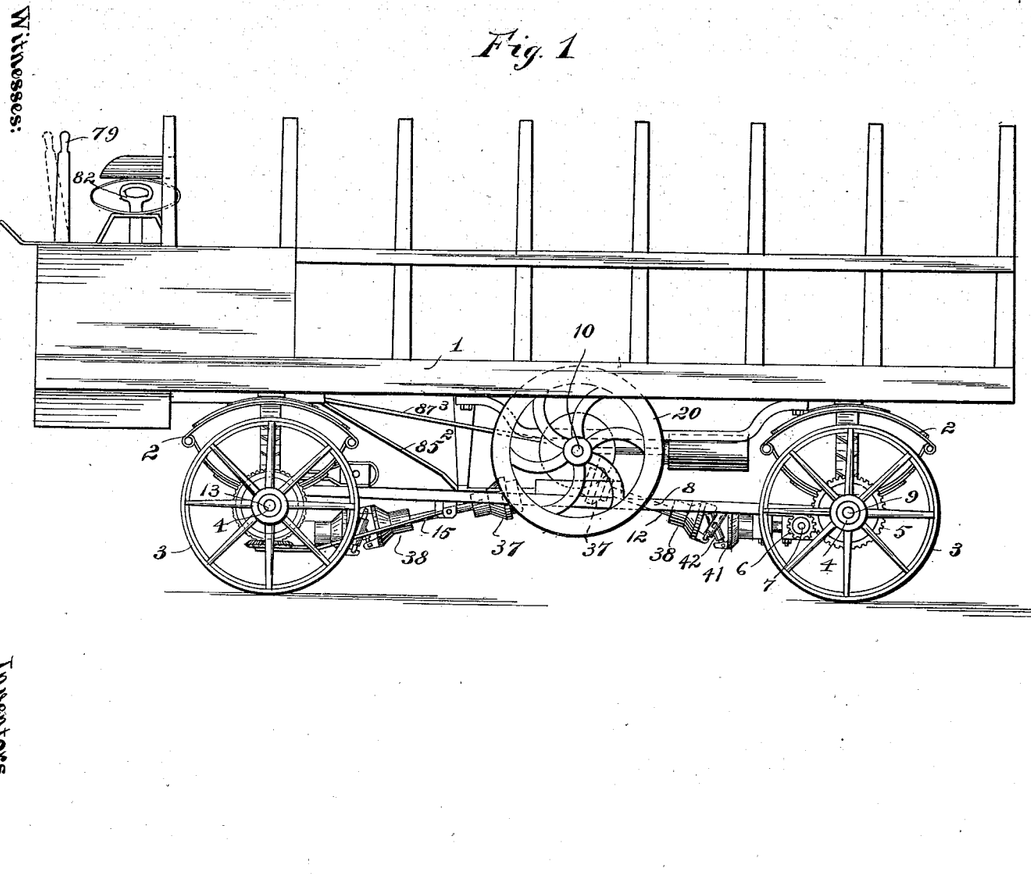
Figure 1 is a side elevation of the autotruck.
Figure 2:
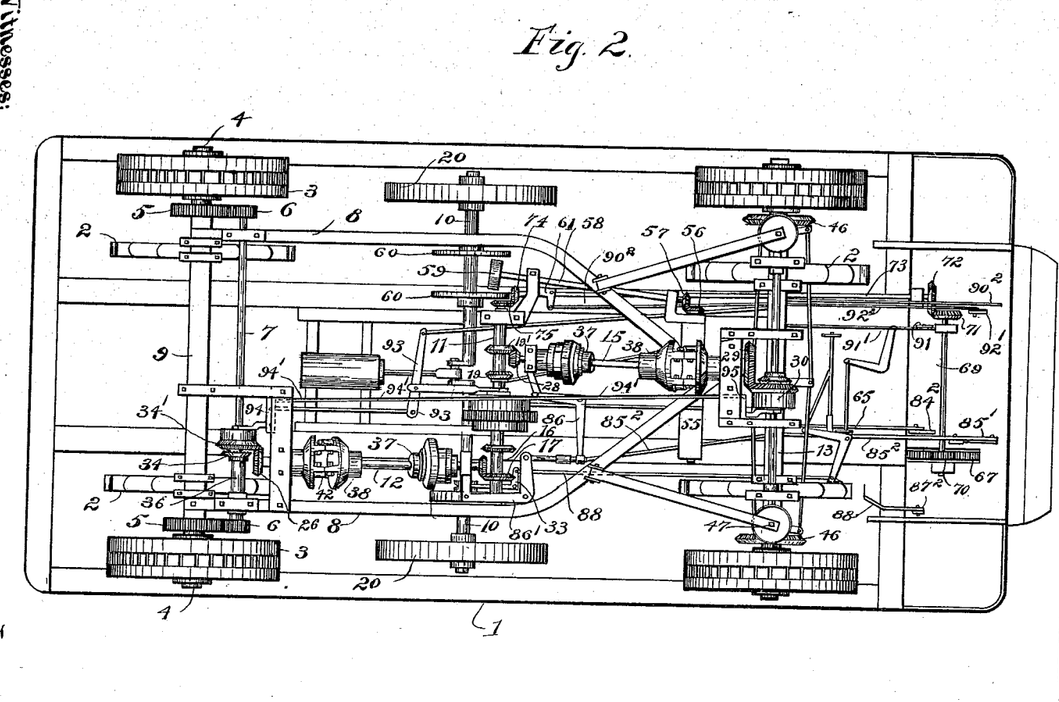
Fig. 2 is a bottom plan view.
Figures 3, 4, 5:
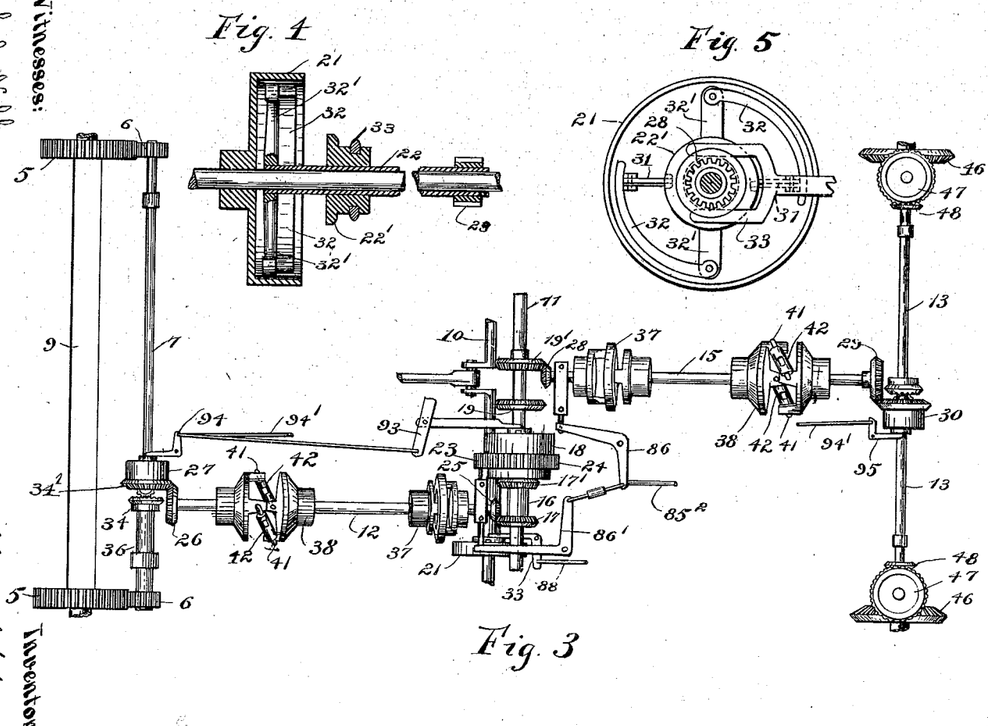
Fig. 3 is an enlarged plan view of the driving-gear.
Fig. 4 is a sectional detail of the clutch.
Fig. 5 is a face view of the same.

The crank-shaft 10 carries on each end a fly-wheel 20, a friction-wheel 21 near one of said fly-wheels, a sleeve 22, on which is a pinion 23, which engages with the spur-gear 24 on the compensating gear 18 on the main shaft 11 and from which the main shaft obtains its motion. The flexible rotary shaft 12, extending from the main shaft 11 to the traction-shaft 7, carries the pinions 25 and 26. The former engages with the facing bevels 17 and 17' on the sleeve 16 on the main shaft and the latter with a bevel 34' on the compensating gear on said traction-shaft 7. The rotary shaft is shiftable in its bearings adjacent the main shaft 11 to engage with either of the facing bevels 17 and 17'. On one side a forward motion is imparted to the traction-shaft, on the other the reverse motion. The rotary shaft 15, extending from the main shaft forward to the traction-shaft 13, carries the pinions 28 and 29, one at each end. The pinion 28 engages with either of the facing bevels 19 and 19' on the main shaft 11 and the pinion 29 with a bevel on a compensating gear 30 on the forward traction-shaft 13, by means of which power is imparted to the front wheels through the connecting-gear hereinafter described. It will be observed that by means of this construction we apply power alike to both the front and rear wheels of the truck simultaneously, the rotary shaft 15 being shiftable in its bearings at the main shaft to permit the pinion 28 to engage either of the bevels 19 or 19' to provide a forward or reverse movement to the traction-shaft 13 in the same manner as applied to the rear traction-shaft 7. The friction-wheel 21 on the crank-shaft 10 is provided with a flange, as shown in cross-section, Fig. 4, and is rigid on the shaft. A movable collar 22' on the sleeve 22 carries two outwardly-diverging extending arms 31, (shown in Fig. 5,) which enter the friction-wheel and engage the friction-shoes 32, which engage with the inner surface of the flange of the wheel. Two other arms 32', extending outwardly in opposite directions from the end of the sleeve 22, engage with the opposite end of the shoes, locking the sleeve to the friction-wheel and crank-shaft when the collar 22' is moved up by the lever 33, operated by a connecting-lever from the driver's seat.

Figures 20, 21, 22:
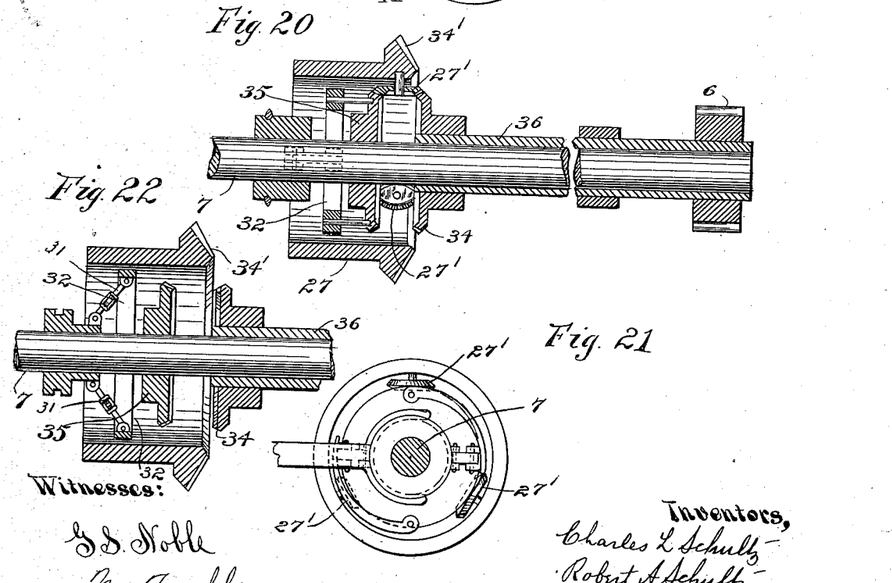
Fig. 20 is a sectional view of one of the compensating gears and clutch operating in same.
Fig. 21 is an end view of same.
Fig. 22 is a sectional view of the same, showing the means for operating clutch.

Mounted on the shaft 7 is a compensating gear 27, having a bevel 34' on one side of the rim. Mounted between the hub and rim of said compensating gear is a series of pinions 27', preferably three, each of which engages a bevel 34 on the end of the sleeve 36, and a similar bevel 35, Fig. 20, is rigid on the shaft 7, all inclosed by the rim of said compensating gear. This permits the rotation of said bevels 34 and 35 at variant rates of speed without varying the power applied. On the opposite end of the sleeve 36 is one of the pinions 6, which engages the spur-gear 5 on the hub of one of the rear wheels. The other pinion 6 on the opposite end of the traction-shaft is rigid on the shaft and engages a similar spur on the hub of the other rear wheel, which provides for a variation of the speed of the rear wheels to facilitate the movement of the truck in making sharp turns or for any emergency which may arise. The compensating gear 18 on the main shaft 11 is similarly constructed and similarly operated; but instead of a bevel on one side of the rim, as above described, it has a spur-gear 24 at its center adapted to engage with the pinion 23 on the crank-shaft. The sleeve 16 has a bevel-gear on the end corresponding with the bevel 34 on sleeve 36. This compensating gear on the main shaft enables us to divide the power of the motor equally between the forward and rear traction-shafts. The compensating gear 30 on the forward traction-shaft 13 is also similar to that on traction-shaft 7, above described, except that the shaft 13 being divided at the center two facing bevel-gears are provided for the separated ends of the shaft which engage the pinions in the compensating gear, precisely coresponding with the facing bevels 34 and 35. (Shown in Fig. 20.) This compensating gear provides the means for driving the front wheels at variant rates of speed when deviating from a straight course.

The friction-clutch above described and illustrated as applied to the friction-wheel 21 is also utilized in the three compensating gears above described and is shown in Figs. 20 and 22, the friction-shoes 32 engaging the inner surface of the rim of the gear as a locking device to lock all gears to the shaft for the purpose of maintaining them at a uniform speed to prevent the variant rates of speed as the occasion may require in an emergency. The friction-shoes 32 are attached to the bevel-gear rigid on the shaft, so that the arms 32' (shown in Fig. 5) are dispensed with.

The rotary shafts 12 and 15 are made to a limited extent flexible by means of the knuckle-joints 37 and 38, which permit the shafts to accommodate themselves to the swaying movement of their bearings suspended from the body 1 caused by the springs 2 when the body is loaded. The knuckle-joints permit the shaft to be out of line, and the knuckle 38 permits a slight variation in length as the body moves up and down. The knuckle 37 is of the usual construction and needs no special description, but 38 is specially constructed for this purpose. It comprises two facing disks 39, with two lugs 40 and 40' projecting from the face of each. The lugs of one of the facing disks are connected to the lugs of the opposing disks by two arms 41, having a swivel 42 in the central part, upon which the arms 41, which are slightly bent, may turn slightly. The two swivel members when the two disks are turned in opposite directions take the position of the letter X with reference to each other and slightly shorten the rotary shafts to accommodate the weaving motion of the springs of the vehicle when under a strain.

The front axle 14 is constructed of one piece with an open jaw 43, the jaw being vertical. The forks provide a bearing for a stanchion 44, mounted vertically between the upper and lower forks of the jaw to which the spindle 45 for the front wheel is attached or may be integral with the spindle is intended to swing horizontally on the stanchion to permit the wheel to turn in any direction. On the hub of the wheel is a bevel-gear 46, which engages with a double bevel-gear 47, supported on the lower end of the stanchion 44, which projects through the lower jaw 43 sufficiently for that purpose. The pinion 48 on the end of the traction-shaft 13 also engages with the double bevel-gear 47 and conveys the power from the traction-shaft 13 to the front wheels and also permits the front wheels to respond to the steering device, hereinafter described. The stanchions 44 project upward through the upper jaw 43 of the axle to permit a flat cross-bar 49 to be rigidly attached horizontally thereto at its center. The two bars 49 are set normally at an angle of about thirty degrees with reference to a straight line longitudinally through the running-gear, the ends projecting rearward approaching each other or inward from the front wheel, the forward ends pointing outwardly or toward the front wheel. The rod 50 connects the rear ends of the two cross-bars 49 together, and a rod 51 connects the outer ends together, a tongue 52 extending from a threaded shaft 54 forward across the center of the axle 14 and the two rods 50 and 51, to each of which it is pivotally attached. In this construction it is essential that the distance between the points of connection 50', 51', and 51² of the tongue 52 with the bars 50 and 51 and the axle should be the same as the connecting-points of the rods at their ends with the center of the cross-bars 49 to secure an equal and uniform movement of the two cross-bars and connected stanchions and spindles. The threaded shaft 54, provided with bearings at each end on a flat bar 55, supported by the frame 8, carries a threaded nut 53 on the rear end of the tongue 52. The threaded shaft 54 carries on one end a bevel-gear 56, which engages with a pinion 57 on the end of a rotary shaft 58, suspended in bearings from the body 1 and on an extension to bar 55. The rotary shaft 58 has a friction-wheel 59 at its opposite end, which engages with one or the other of two facing friction-plates 60 on the end of the crank-shaft 10. The rotary shaft 58 is shiftable in its bearings to engage with either of said facing friction-plates by means of an L 61, connected with the shifting-lever at the driver's seat. It will be observed that by this construction the movement of the nut on the threaded shaft changes the direction of the front wheels and that the position of the cross-bars 49 causes the wheels to turn in either direction freely without cramping.

Figures 16, 17:
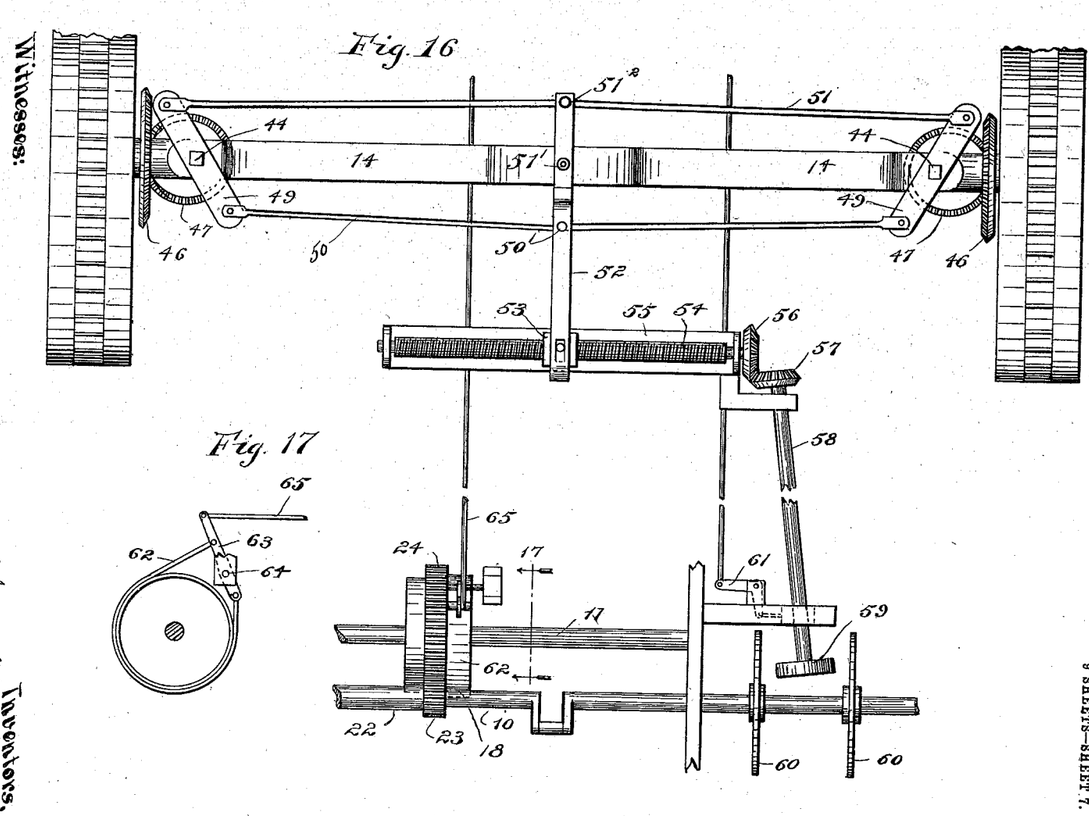
Fig. 16 is a top plan view of steering and brake device.
Fig. 17 is a detail showing a brake.

The main compensating gear 18 has its rim somewhat elongated for the purpose of providing a flange for the operation of the friction-clutch above described and also for the purpose of utilizing the perimeter for attaching a brake. This brake consists of a band 62, Figs. 16 and 17, which encircles the flange of the rim and has its two ends connected, as shown in Fig. 17, by a lever 63, which has a bearing 64, which serves as a fulcrum to increase the friction of the band on the flange by means of the rod 65, connected with the brake-lever at the driver's seat.

Figure 18:
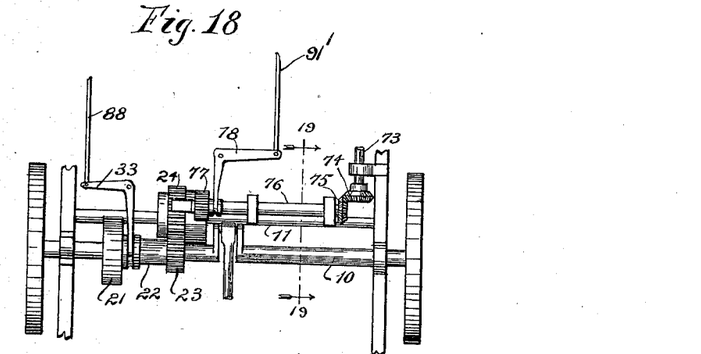
Fig. 18 is a view of main driving-shaft and operative parts.
Figure 19:
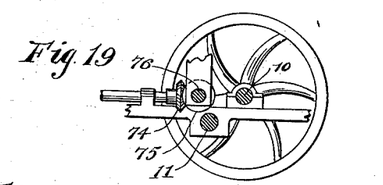
Fig. 19 is a sectional detail of same on line 19 19 of Fig. 18.

A drum 66 is mounted in bearings underneath the platform of the driver's seat and above the floor of the body in front. This drum is provided with a shaft 68, on the ends of which is rigidly attached a large spur-gear 67, which projects slightly below the level of the floor of the body. Underneath the drum and floor of the body is a shaft 69, parallel with the drum-shaft, suspended in bearings from the body, having at one end a pinion 70 to engage the large spur-gear 67 on the drum-shaft. On the opposite end of the parallel shaft 69 is a bevel-gear 71, which engages with a similar bevel 72 on a rotary shaft 73, carrying another bevel 74 at its opposite end to engage with similar bevel 75 on the end of a horizontal shaft 76 in bearings and parallel with the main shaft 11. (See Fig. 18.) On the opposite end of said shaft 76 is a shiftable pinion 77, which may be moved into engagement with the spur 24 on the main shaft 11 by means of an L 78, operatively connected with a lever at the seat of the driver, by means of which the motion from the main shaft is imparted to the drum.

In the operation of the mechanism of the autotruck we use five hand-levers and one foot-lever erected on the platform on the front end of the body 1 at the driver's seat. These levers and their connections are as follows: The lever 79 operates the gear which reverses the movement of the vehicle and is connected with a rod 85, extending downward to the running-gear, where it connects with an L-shaped lever 85', from which extends rearward a rod 85² and attached to the two L-shaped levers 86 and 86'. The former operates the shiftable bearing of the rotary shaft 15, the latter the shiftable bearing of the rotary shaft 12, thus giving the two rotary shafts the same movement simultaneously by one movement of the lever 79. The lever 80 operates the friction-clutch in the friction-gear 21. This lever extends downward to a horizontal shaft 87 beneath the footboard, to which it is attached. This shaft 87 is provided with an arm to which is connected a vertical rod 87' and L 87². To the latter is attached a horizontal rod 88, which extends rearward to the L 33, attached to the collar 22' on the sleeve 22 on crank-shaft 10, thus connecting the lever 80 with the friction-clutch in friction-wheel 21. The lever 81, operating the steering device, connects with a horizontal shaft 89 underneath the footboard. A short arm on the end of this shaft is connected with a vertical rod 90, which is attached to an L 90'. A horizontal rod 90² extends rearward and connects the L 90' with the L 61, attached to the shiftable bearing of the rotary shaft 58, by means of which connections the rotary shaft 58 is shifted into engagement with the friction-plates 60, operating the steering-gear. The lever 82, operating the drum, extends downward to an L 91 beneath the body, to which is connected a horizontal rod 91', which connects with an L 78 and pinion 77 on shaft 76, Fig. 18, by means of which the pinion is shifted to engage with the spur-gear 24, transmitting power to the drum-shaft. The lever 83 operates the friction-clutches in the compensating gears on the two traction-shafts 7 and 13 and main shaft 11. This lever extends downward to an arm beneath the footboard, to which is attached the vertical rod 92, which connects with an L 92'. To this L is connected a horizontal rod 92², which extends to and connects with a double L 93 and L 94 and friction-clutches in the compensating gears on shafts 11 and 7. Also from the L 94, extending forward to shaft 13, is a rod 94', connecting with an L 95 and clutch on said compensating gear. Thus one movement of the lever 83 sets or releases the clutch in the three compensating gears simultaneously. The foot-lever 84 connects with a horizontal shaft 84' underneath the footboard, where it is attached by L 84² and rod 65 to the lever 63, heretofore (see Figs. 16 and 17) described, operating the brake.

Figure 6:
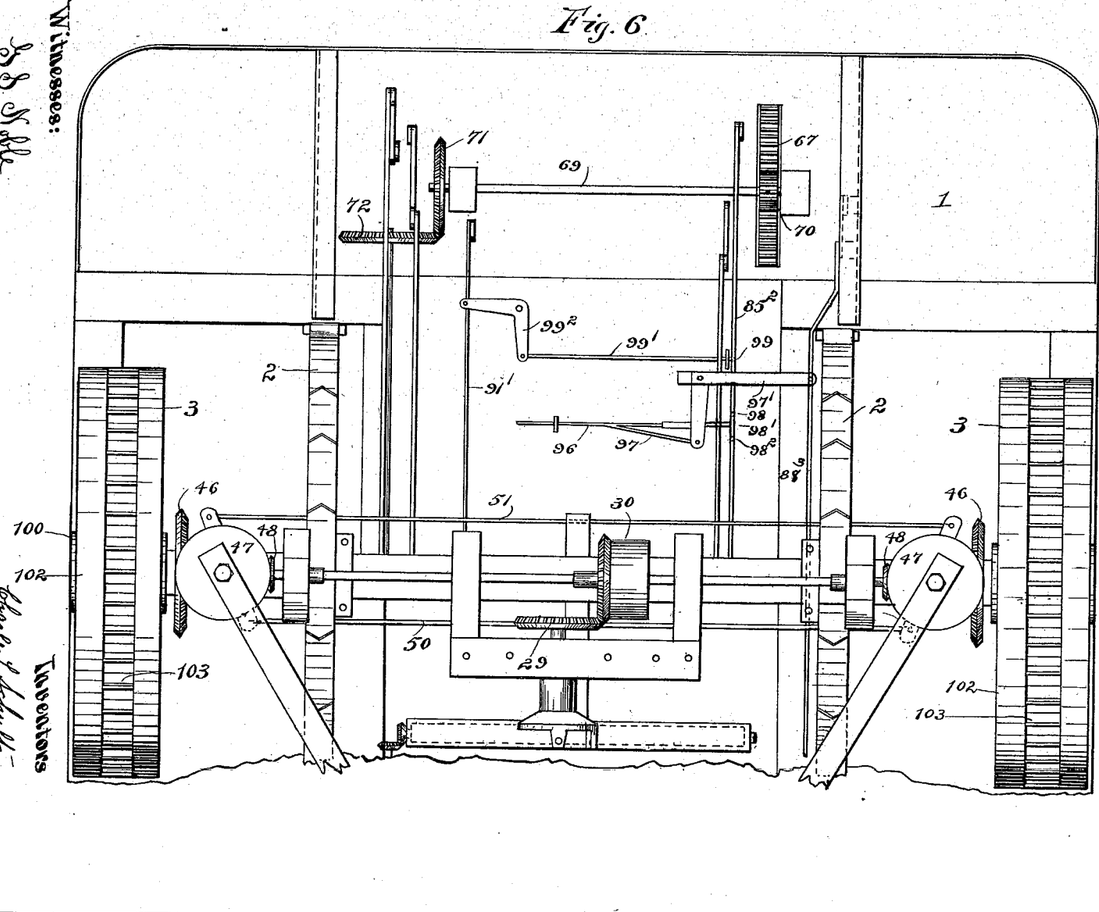
Fig. 6 is an enlarged bottom view of the front part of the truck, showing the mechanism of the hoisting-drum and interlocking levers.
Figure 7:
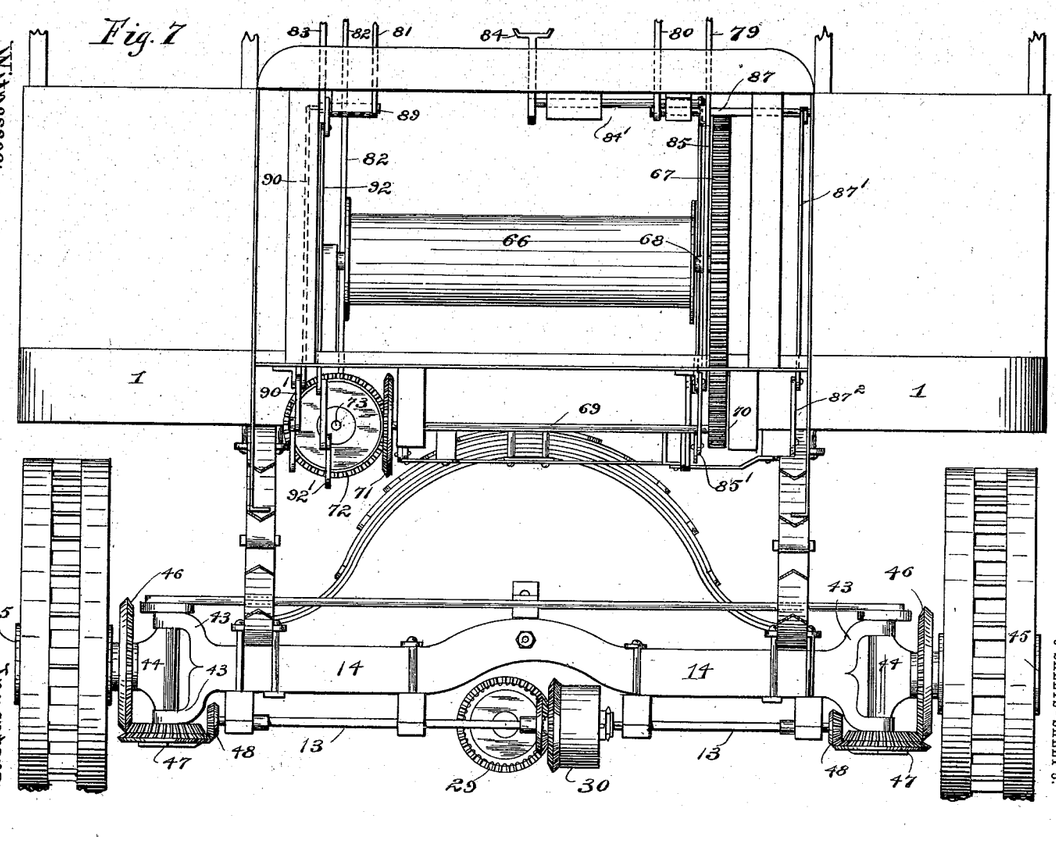
Fig. 7 is a front elevation showing construction of front axle and drum-gears.

*Interlocking levers, (shown in Fig. 6.)*—The rod 85², connected with the hand-lever 79, operating the reverse mechanism, has three perforations in alinement and designated by 98, 98', and 98², in which engages the horizontally-mounted pin 96, which has a fork 97, attached to L 97' and moved forward by the rod 88³, connected with the hand-lever 80, operating the friction-clutch. The pin 96 enters either of the three perforations, depending upon whether the operating-lever 79 is set on the center or forward or back of center. When the pin 96 enters either of the three perforations, the lever 79 is locked—in other words, when the lever 80, operating the friction-clutch, is moved forward the pin 96 enters one of the perforations in the connecting-rod 85², locking the lever 79, so that the reverse movement cannot be operated until the friction-clutch is first released. The same rod 85² has another perforation at 99, in which engages the pin 99', attached to the L 99², which is connected with rod 91', which connects with the lever 82, which operates the drum from the seat. The pin 99' cannot enter the perforation 99 unless the lever 79 is on the center. Then the lever 82, operating the drum, being moved up, the pin 99' enters the perforation 99, locking the lever 79 in that position, thereby preventing motion to the truck, when the drum may be set in motion by moving the lever 80, setting the friction-clutch in the friction-wheel 21.

Figures 8, 9:
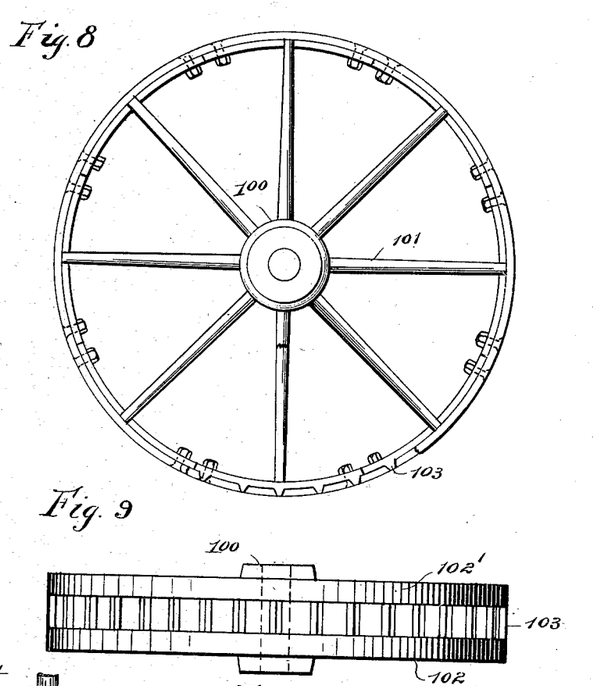
Figs. 8, 9, 10 are views of the wheel of the truck.
Figure 10:
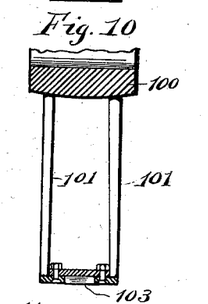
Figure 11:
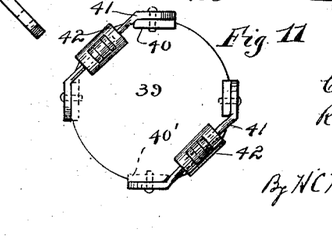
Fig. 11 is a face view of a knuckle (on rotary shafts) having one disk removed.
Figures 12, 14:
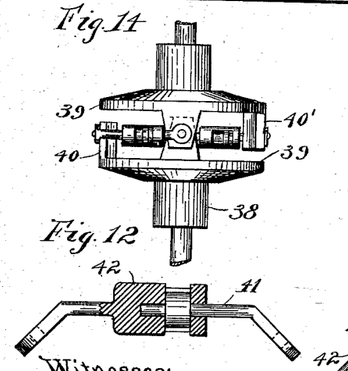
Fig. 12 is a detail of a swivel in said knuckle.
Fig. 14 is a view of the knuckle-joint connected.
Figure 13:
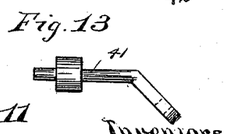
Fig. 13 is a detail of one of the swivel members.
Figure 15:
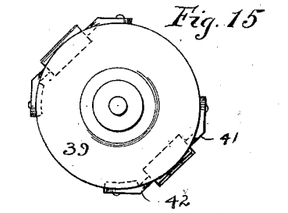
Fig. 15 is a face view of the same.

The wheel of the truck (shown in Figs. 8, 9, and 10) comprises a long hub 100, on which is mounted a double set of spokes 101, as shown in cross-section, Fig. 10. The tread of the wheel comprises two rims 102 and 102', each of the rims being supported on the hub by a separate set of spokes. The two rims are joined together by means of cogs 103, which are placed at intervals of about two or more inches apart around the tread between the two rims. These cogs are secured to the inner sides of the rims by means of bolts. The cogs 103 are intended to be flush with the face or tread of the two rims. The cogs are removable. This method of construction secures for the wheel a broad tread and gives the wheel a frictional contact with the paved street without injury to the pavement.

Figure 23:
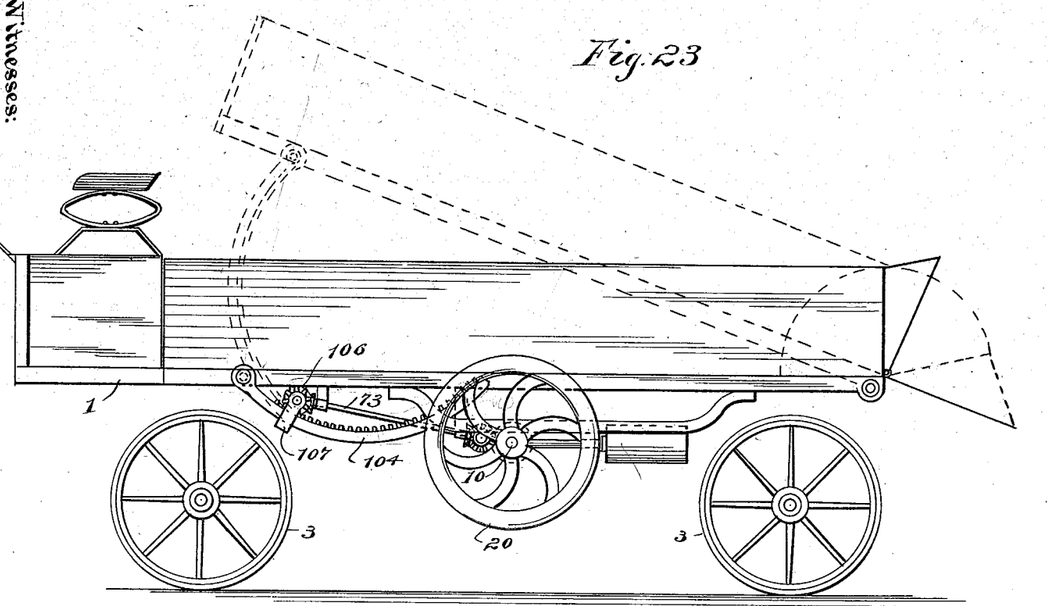
Fig. 23 is a side elevation of dumping-cart.
Figure 24:
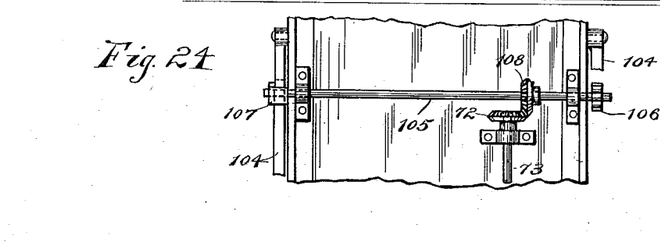
Fig. 24 is a bottom view of front of same.

Figs. 23 and 24 show a modification in which the truck may be used as a dumping-cart. A crescent-shaped rack 104 has one end attached to the side of the front end of the body on each side, the other end being free. A shaft 105, having bearings underneath the body 1, has a spur-gear 106 on each end to engage with the rack 104, placed on each side of the body. A clevis-shaped strap 107, having the open end attached to the shaft at the spur 106 in the rack, secures to the rack a sliding support. The rotary shaft 73 used to operate the drum described above serves to make the connection with the motive power. The pinion 72 on the end of the rotary shaft engages with a similar gear 108 on the shaft 105. (See Fig. 24.) When the power is applied, it raises the forward end of the body to discharge the load at the rear.

In the operation to move the autotruck forward we move the hand-lever 79 forward, then move up the lever 80, which sets the friction-clutch in the friction-wheel 21 on the driving-shaft to transmit motion to the main shaft. To reverse the movement of the vehicle, first release the friction-clutch in the friction-wheel 21 by moving back lever 80, then move the lever 79 back of center, and again move forward the lever 80, and the vehicle will reverse its movement. To change the direction of the vehicle, move the steering-lever 81, which shifts the bearings of the rotary shaft 58 to move the lever 80 forward, secures one direction and backward a contrary direction. To set the friction-clutches in the compensating gear for the purpose of holding them rigid on their several shafts, we move up the lever 83. To operate the drum, we first set the lever 79 at center and then move lever 82. To operate the brake, place foot-pressure on the foot-lever 84.

Having thus described our invention, what we claim as new, and desire to protect by Letters Patent, is—

1. In an autotruck, a four-wheeled truck, a driving and a driven shaft, a motor having but one direction connected with said driving-shaft, a compensating gear on said driven shaft, a traction-shaft for the front wheels of said truck and a traction-shaft for the rear wheels of said truck, each carrying gears, rotary shafts to impart motion from said driven shaft to said two traction-shafts simultaneously and means for imparting motion to said rotary shafts.

2. In an autotruck, a four-wheeled truck, a motor having but one direction, a driven shaft mounted in bearings suspended from the body of said truck, a compensating gear on said driven shaft, two pairs of facing bevels, one pair on a sleeve the other pair rigid on said driven shaft, a traction-shaft at each end of said truck, a compensating gear on each of said traction-shafts, a friction-clutch for each compensating gear, means for imparting motion to said driven shaft and from said driven shaft to said traction-shafts simultaneously.

3. In an autotruck, a four-wheeled truck, a motor having but one direction, a driving-shaft connected with said motor, a driven shaft carrying a compensating gear, and two reversing-gears, a traction-shaft at each end of said truck each carrying a compensating gear, a bevel-gear on the rim of each of said compensating gears on said traction-shafts, a rotary shaft having a pinion at each end to engage each of said reversing-gears on said driven shaft and the bevel-gear on the rim of said compensating gears on said traction-shafts, means for imparting motion to said rotary shafts simultaneously.

4. In an autotruck, a four-wheeled truck, a body for said truck, a driven shaft having bearings suspended from said body, a compensating gear on said driven shaft, two facing bevels on a sleeve on said driven shaft, two similar facing bevels rigid on said shaft, a rear-end traction-shaft, carrying gears to give motion at variant rates of speed to the rear wheels of said truck, a forward-end traction-shaft carrying gears to give motion at variant rates of speed to the front wheels of said truck, a rotary shaft having a pinion at each end to transmit motion from said driven shaft to each of said traction-shafts, shiftable bearings for said rotary shafts, means for shifting said bearings and means for imparting motion to said driven shaft and to said rotary shafts simultaneously.

5. In an autotruck, a four-wheeled truck, a driving and a driven shaft, a compensating gear on said driven shaft carrying a spur-gear, two facing bevels on a sleeve on said driven shaft, two similar facing bevels rigid on said driven shaft, a friction-wheel on said driving-shaft, a sleeve on said driving-shaft, a collar on said sleeve carrying a friction-clutch to engage said friction-wheel, a pinion on said sleeve on said driving-shaft to engage said spur-gear on said compensating gear on the driven shaft, a traction-shaft at each end of said truck carrying a compensating gear, a bevel-gear on the rim of each of said compensating gears, a pinion on each end of said traction-shafts, a rotary shaft having a pinion on each end to engage the bevel-gear on each traction-shaft and the facing bevels on said driven shaft, shiftable bearings for said rotary shafts, means to shift said bearings and to impart motion to said rotary shafts simultaneously.

6. In an autotruck, a four-wheeled truck, a motor having but one direction, a driving-shaft operatively connected with said motor, a driven shaft, a compensating gear on said driven shaft carrying a spur-gear, two facing bevels rigid on said driven shaft, a collar on said driven shaft, a clutch on said collar to engage said compensating gear, a traction-shaft at each end of said truck, a compensating gear on each traction-shaft, a collar on each of said traction-shafts, a friction-clutch on each of said collars to engage said compensating gears, a bevel on the rim of each compensating gear on said traction-shafts, a flexible rotary shaft for each traction-shaft having a pinion at each end, one of said pinions to engage the facing bevels on the driven shaft the other the bevel on the compensating gear on the traction-shafts, a shiftable bearing for one end of each of said rotary shafts, means for shifting said bearings and means for imparting motion to said rotary and driven shafts simultaneously.

7. In an autotruck, a four-wheeled truck, a driving and a driven shaft, a traction-shaft at each end of said truck, a compensating gear and a movable collar on said driven and traction shafts, friction-shoes in each compensating gear, outwardly-extending arms on each of said collars to engage said friction-shoes in each of said compensating gears, a lever to move up the collars and set the friction-shoes in the three compensating gears simultaneously.

8. In an autotruck, the combination of a driving-shaft with a motor having but one direction operatively connected with a crank on said driving-shaft, a friction gear-wheel rigid on said shaft and a pinion on a sleeve on said shaft, a driven shaft mounted in bearings parallel with said driving-shaft and carrying a compensating gear, a spur-gear on said compensating gear, two facing bevels on a sleeve on said driven shaft and two similar facing bevels rigid on the same shaft, a traction-shaft for the rear wheels of said truck carrying a compensating gear, a pinion on each end of said traction-shaft, a spur-gear on the hub of each of the rear wheels of said truck to engage said pinions on said traction-shaft, a bevel on the rim of said compensating gear on said traction-shaft, a traction-shaft for the front wheels of said truck also carrying a compensating gear and a bevel on each end, a bevel on the rim of said compensating gear on said last-named traction-shaft, two flexible rotary shafts carrying a pinion on each end, a shiftable bearing at one end of said rotary shafts, said rotary shafts adapted to transmit motion from said driven shaft to said traction-shafts, means for shifting the bearings and imparting motion simultaneously to both of said rotary shafts.

9. In an autotruck, the combination of a motor having but one direction with a driving-shaft, a friction-wheel on said driving-shaft, a sleeve carrying a pinion on one end of said shaft and a collar on the other, a friction-clutch on said collar to engage with said friction-wheel to lock said sleeve to said driving-shaft, a driven shaft parallel with said driving-shaft, a compensating gear on said driven shaft, a spur-gear on said compensating gear to engage with said pinion on the driving-shaft, two facing bevels on a sleeve on said driven shaft, two similar facing bevels rigid on said driven shaft, a traction-shaft at the rear end of said truck, carrying a compensating gear, a bevel on the rim of said compensating gear, a flexible rotary shaft having a pinion on each end to engage the facing bevels on the sleeve on said driven shaft and the bevel on the compensating gear on said rear traction-shaft, a traction-shaft on the front end of said truck carrying a compensating gear, a bevel on the rim of said compensating gear, a flexible rotary shaft having a pinion on each end to engage the two facing bevels rigid on said driven shaft, and the bevel on the compensating gear on the traction-shaft on the front of said truck, a shiftable bearing for one end of each of said rotary shafts means for shifting said bearings and means for setting up said friction-clutch in said friction-wheel on said driving-shaft.

10. In an autotruck, a motor having but one direction a driving and a driven shaft having bearings in a central position on said truck, a compensating gear on said driven shaft, a traction-shaft forward of said driving and driven shafts, a traction-shaft rearward of said driving and driven shafts, a compensating gear on each of said traction-shafts, a friction-clutch for said compensating gear on said driven shaft and a similar clutch for the compensating gear on each of said traction-shafts, a lever to move said friction-clutches into engagement simultaneously with their several compensating gears.

11. In an autotruck, the combination of a motor having but one direction with a driving-shaft provided with balance-wheels and a friction-wheel rigid on the said shaft, a sleeve on said driving-shaft carrying a pinion on one end and a collar on the other, a friction-clutch on said collar to engage in said friction-wheel, a driven shaft parallel with said driving-shaft, a compensating gear on said driven shaft, a spur-gear on said compensating gear to engage said pinion on said sleeve on said driving-shaft, two facing bevels on a sleeve on said driven shaft, a flexible rotary shaft having a pinion on each end, a traction-shaft adjacent and parallel with the rear axle, a compensating gear on said traction-shaft, a bevel on the rim of said compensating gear, two facing bevels rigid on said driven shaft, a traction-shaft at and parallel with the front axle carrying a compensating gear, a bevel on the rim of said compensating gear, a flexible rotary shaft having a pinion on each end, a shiftable bearing for one end of each of said rotary shafts, means for shifting said bearings and imparting motion to said rotary shafts simultaneously.

12. In an autotruck, the combination of a motor having but one direction, a driving and a driven shaft in bearings in a central part of said truck, a traction-shaft at the rear of said truck, a compensating gear on said traction-shaft having a bevel on the rim of said gear, a sleeve on the end of said traction-shaft having a bevel at one end to engage in said compensating gear, and a pinion on the other end, a second pinion rigid on the opposite end of said traction-shaft, a spur-gear on the hub of each of the rear wheels to engage said pinions on the ends of said traction-shaft, a traction-shaft at the front of said truck and carrying a compensating gear, a bevel on the rim of said compensating gear, a pinion on each end of said traction-shaft, a vertically-mounted bevel on each of the hubs of the front wheel, a double bevel mounted horizontally underneath each end of the front axle to engage with the vertical bevel on the hub and the pinion on the end of said traction-shaft, and means for imparting motion to said traction-shafts simultaneously from said driven shaft.

13. In an autotruck, the combination with a motor having but one direction with a driving and a driven shaft, a two-part traction-shaft on the forward end of said truck, a compensating gear on said traction-shaft, a bevel on the rim of said compensating gear, facing bevels on the divided ends of said traction-shaft, a series of pinions journaled between the hub and rim of said compensating gear to engage with said facing bevels, a pinion on each end of said traction-shaft, a front axle having open jaws at each end, a vertical stanchion pivotally mounted between said jaws and adapted to swing horizontally on its bearings, a spindle for the front wheel projecting from said stanchion, a bevel-gear rigid on the inner end of the hub of the front wheel, a horizontal double bevel in bearings underneath the end of the front axle adapted to engage simultaneously the vertical bevel on the hub and the pinion on the end of the traction-shaft, means for transmitting motion to said traction-shaft from said driving and driven shafts.

14. In an autotruck steering-gear, the combination with a motor having but one direction of a driving-shaft, two facing friction-plates on said driving-shaft, a threaded driven shaft parallel with and rear of the front axle of said truck, a bevel-gear on the end of said threaded shaft, a rotary shaft having a friction-wheel on one end to engage with said friction-plates and a pinion on the other end to engage said bevel on said threaded shaft, a shiftable bearing for one end of said rotary shaft, an axle for the front wheels of said truck having a jaw at each end, a spindle for said axle and wheel pivotally journaled in said jaw and adapted to swing horizontally, a flat bar rigidly attached at its center to the pivotal post of said spindle set at an angle with reference to the front wheel and extending forward and rear of said front axle, a rod to connect the rear end of said bars and a similar longer rod to connect the front end of said bars, a tongue having a nut on one end to travel on said threaded shaft, said tongue pivotally attached to the center of said rods and of said front axle, means for shifting the bearing and imparting motion to said rotary shaft.

15. In an autotruck, the combination of a motor having but one direction with a driving-shaft, a main shaft, and a parallel-driven shaft, a shiftable spur-pinion on said parallel-driven shaft to engage with a gear on said main shaft and a bevel on the opposite end, a drum on the forward end of said autotruck having a shaft, a spur-gear on one end of said drum-shaft, a second shaft underneath and parallel with said drum, a bevel-gear on one end of said shaft, a pinion on the other end to engage the spur-gear on the drum-shaft, a rotary shaft having a bevel-gear on one end to engage said bevel-gear on the shaft underneath said drum, and a pinion at the other end to engage said bevel on said parallel-driven shaft, and means for imparting motion to said rotary shaft.

16. In a front axle for an autotruck, a shaft having open jaws at each end, a spindle provided with pivotal bearings in each of said open jaws to swing horizontally, an inwardly-facing bevel gear-wheel on the hub of the wheel on said spindle a horizontal upward-facing double-bevel gear journaled on the lower end of the pivotal bearing of said spindle to engage with said bevel on the hub and a pinion on the end of a traction-shaft substantially as specified.

17. In a compensating gear for an autotruck, the combination of two facing bevels on the traction-shaft with a compensating wheel between the said two facing bevels, a series of pinions journaled between the hub and the rim of said compensating wheel to engage said two facing bevels, a flange projecting from the rim of said compensating wheel, a movable collar on the shaft carrying said compensating gear, two arms extending and diverging from said collar, friction-shoes attached to the ends of said arms to engage the flange on said compensating gear, and means to move up said collar to set said clutch.

18. In an autotruck the combination of a running-gear having springs mounted thereon and supporting a body for said truck, with a driven shaft and two traction-shafts, for said truck, said driven shaft having its bearings suspended from said body, facing bevels on said driven shaft, and bevel-gears on each of said traction-shafts, two flexible rotary shafts carrying pinions having one of their bearings suspended from said body, and adapted to transmit motion from said driven shaft to said traction-shafts simultaneously, and means for giving motion to said driven shaft.

19. In an autotruck, a driving and a driven shaft, a friction-wheel on said driving-shaft, a clutch for said friction-wheel, a lever to operate said clutch, a traction-shaft at each axle of said autotruck, a compensating gear on said driven shaft and on said traction-shafts, rotary shafts connecting said driven shaft with said traction-shafts, a shiftable bearing for each of said rotary shafts, a lever to shift said bearings, a connecting-rod for said lever, perforations in said connecting-rod, a pin actuated by said friction-clutch lever to engage said perforations, a motor having but one direction to impart motion to said driving and driven shafts substantially as specified.

20. In an autotruck, the combination of a motor having but one direction, with a driving and a driven shaft, a friction-wheel on said driving-shaft, a pinion on a sleeve on said shaft, a clutch for said friction-wheel, a compensating gear on said driven shaft, a spur on said compensating gear to engage with said pinion on said driving-shaft, two facing bevels rigid on said driven shaft, two facing bevels on a sleeve on said driven shaft, a rotary shaft forward and a rotary shaft rearward of said driven shaft, a pinion on each end of said rotary shafts, a shiftable bearing for one end of said rotary shafts, two traction-shafts for said truck, a compensating gear on each of said traction-shafts, a bevel on the rim of each compensating gear, a pinion on each end of said traction-shaft, a spur-gear on each of the hubs of the rear wheel, a bevel-gear on the hub of each front wheel, a double bevel to engage said bevel on the hub of the front wheel and said pinion on the traction-shaft, a steering-gear for said front wheels, a friction-clutch for each compensating gear on said driven and traction shafts, means for shifting the bearings and imparting motion to said rotary shafts.

In testimony whereof we affix our signatures in presence of two witnesses.

CHARLES L. SCHULTZ.
ROBERT A. SCHULTZ.

Witnesses:
M. FAULDS,
H. C. HUNSBERGER.